United States Patent
Chen et al.

(10) Patent No.: US 9,607,147 B2
(45) Date of Patent: Mar. 28, 2017

(54) METHOD AND DEVICE FOR DETECTING SOFTWARE-TAMPERING

(71) Applicant: Tencent Technology (Shenzhen) Company Limited, Shenzhen (CN)

(72) Inventors: Shuhua Chen, Shenzhen (CN); Tianming Xiao, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 147 days.

(21) Appl. No.: 14/226,752

(22) Filed: Mar. 26, 2014

(65) Prior Publication Data
US 2014/0380469 A1 Dec. 25, 2014

Related U.S. Application Data

(63) Continuation of application No. PCT/CN2013/090045, filed on Dec. 20, 2013.

(30) Foreign Application Priority Data

Jun. 20, 2013 (CN) .......................... 2013 1 0247480

(51) Int. Cl.
*G06F 21/00* (2013.01)
*G06F 21/55* (2013.01)
*G06F 21/51* (2013.01)

(52) U.S. Cl.
CPC ............ *G06F 21/554* (2013.01); *G06F 21/51* (2013.01); *G06F 2221/033* (2013.01)

(58) Field of Classification Search
None
See application file for complete search history.

(56) References Cited

U.S. PATENT DOCUMENTS 6,347,398 B1 *  2/2002  Parthasarathy ........... G06F 8/60
                                                   707/999.202
7,233,940 B2 *  6/2007  Bamberger ........... G06F 11/006
                         (Continued)

FOREIGN PATENT DOCUMENTS

CN           1937498 A      3/2007
CN          101163014 A     4/2008
                (Continued)

OTHER PUBLICATIONS

Tencent Technology, ISR, PCT/CN2013/090045, Mar. 20, 2014, 3 pgs.
(Continued)

*Primary Examiner* — Jeffery Williams
(74) *Attorney, Agent, or Firm* — Morgan, Lewis & Bockius LLP

(57) ABSTRACT

A method and system for detecting software tampering includes: at a device having one or more processors and memory: receiving a software verification instruction from a server, the software verification instruction comprising a verification parameter dynamically selected by the server for verifying whether particular software stored at the device contains unauthorized modifications; executing a respective verification procedure corresponding to the verification parameter to obtain a first verification data value; and returning the first verification data value to the server, wherein the server compares the first verification data value to a second verification data value to determine whether the particular software stored at the device contains unauthorized modifications.

18 Claims, 6 Drawing Sheets

(56) References Cited

U.S. PATENT DOCUMENTS

| | | | | |
|---|---|---|---|---|
| 7,624,394 | B1 * | 11/2009 | Christopher, Jr. | G06F 8/61 717/174 |
| 8,627,081 | B2 * | 1/2014 | Grimen | H04N 7/1675 713/168 |
| 8,819,827 | B1 * | 8/2014 | Easttom | G06F 21/51 713/150 |
| 8,887,287 | B2 * | 11/2014 | Garay | G06F 21/57 709/224 |
| 8,918,780 | B2 * | 12/2014 | Tagliabue | G06F 3/1285 717/121 |
| 9,177,153 | B1 * | 11/2015 | Perrig | G06F 21/577 |
| 2004/0230797 | A1 * | 11/2004 | Ofek | G06F 21/14 713/168 |
| 2006/0085645 | A1 * | 4/2006 | Bangui | G06F 21/123 713/173 |
| 2006/0090209 | A1 * | 4/2006 | Garay | G06F 21/57 726/26 |
| 2007/0169109 | A1 * | 7/2007 | Neswal | G06F 8/61 717/174 |
| 2009/0132823 | A1 * | 5/2009 | Grimen | H04N 7/1675 713/171 |
| 2014/0032915 | A1 * | 1/2014 | Muzammil | H04L 9/3236 713/176 |

FOREIGN PATENT DOCUMENTS

| | | |
|---|---|---|
| CN | 101662465 A | 3/2010 |
| CN | 101783801 A | 7/2010 |
| CN | 101834867 A | 9/2010 |
| CN | 102299930 A | 12/2011 |
| CN | 102546179 A | 7/2012 |

OTHER PUBLICATIONS

Tencent Technology, Written Opinion, PCT/CN2013/090045, Mar. 20, 2014, 4 pgs.

Tencent Technology, IPRP, PCT/CN2013/090045, Dec. 22, 2015, 5 pgs.

* cited by examiner

```
00000000-00009000 r-xp 00000000 1f:00 618    /system/bin/app_process
00009000-0000a000 rwxp 00001000 1f:00 618    /system/bin/app_process
0000a000-001a6000 rwxp 0000a000 00:00 0      [heap]
10000000-10001000 ----p 10000000 00:00 0
10001000-10100000 rwxp 10001000 00:00 0
40000000-40000000 r-xs 00000000 00:0a 194    /dev/__properties__ (deleted)
40000000-40007000 r-xp 40000000 00:00 0
40007000-4050b000 rwxp 00000000 00:07 345    /dev/ashmem/dalvik-heap (deleted)
4050b000-41009000 ----p 00502000 00:07 345   /dev/ashmem/dalvik-heap (deleted)
41009000-41049000 rwxp 00000000 00:07 346    /dev/ashmem/dalvik-bitmap-1 (deleted)
41049000-41089000 rwxp 00000000 00:07 347    /dev/ashmem/dalvik-bitmap-2 (deleted)
41089000-410aa000 rwxp 00000000 00:07 348    /dev/ashmem/dalvik-card-table (deleted)
410aa000-410ad000 rwxp 410aa000 00:00 0
410ad000-410ae000 ----p 00000000 00:07 349   /dev/ashmem/dalvik-LinearAlloc (deleted)
410ae000-4128b000 rwxp 00001000 00:07 349    /dev/ashmem/dalvik-LinearAlloc (deleted)
4128b000-415ad000 ----p 001de000 00:07 349   /dev/ashmem/dalvik-LinearAlloc (deleted)
415ad000-415ae000 r-xs 00002000 1f:00 662    /system/framework/core-junit.jar
415ae000-415b4000 r-xp 00000000 1f:01 299    /data/dalvik-cache/system@framework@core-junit.jar@classes.dex
415b4000-415bd000 rwxp 415b4000 00:00 0
415bd000-415be000 r-xs 00000000 00:07 400    /dev/ashmem/SurfaceFlinger read-only heap (deleted)
415be000-415bf000 r-xs 001c6000 1f:00 657    /system/framework/core.jar
415bf000-419e7000 r-xp 00000000 1f:01 293    /data/dalvik-cache/system@framework@core.jar@classes.dex
419e7000-41a26000 rwxp 419e7000 00:00 0
41a26000-41a27000 r-xs 00046000 1f:00 672    /system/framework/bouncycastle.jar
41a27000-41ad4000 r-xp 00000000 1f:01 294    /data/dalvik-cache/system@framework@bouncycastle.jar@classes.dex
41ad4000-41ad5000 r-xs 0007d000 1f:00 663    /system/framework/ext.jar
41ad5000-41c0a000 r-xp 00000000 1f:01 295    /data/dalvik-cache/system@framework@ext.jar@classes.dex
41c0a000-41c0b000 r-xs 002cc000 1f:00 658    /system/framework/framework.jar
41c0b000-422bb000 r-xp 00000000 1f:01 296    /data/dalvik-cache/system@framework@framework.jar@classes.dex
422bb000-42348000 rwxp 422bb000 00:00 0
42348000-42349000 r-xs 00015000 1f:00 659    /system/framework/android.policy.jar
42349000-42377000 r-xp 00000000 1f:01 297    /data/dalvik-cache/system@framework@android.policy.jar@classes.dex
42377000-42378000 r-xp 00098000 1f:00 655    /system/framework/services.jar
42378000-424c7000 r-xp 00000000 1f:01 298    /data/dalvik-cache/system@framework@services.jar@classes.dex
424c7000-42a84000 r-xp 00000000 1f:00 524    /system/usr/icu/icudt44l.dat
42a84000-42a70000 rwxp 42a84000 00:00 0
42a95000-42ac4000 r-xs 00000000 1f:00 474    /system/fonts/DroidSans.ttf
42ac4000-42b3f000 r-xs 00000000 1f:00 492    /system/usr/share/zoneinfo/zoneinfo.dat
42b3f000-42b78000 r-xp 0072e000 1f:00 669    /system/framework/framework-res.apk
42b78000-42eee000 r-xs 003b9000 1f:00 669    /system/framework/framework-res.apk
42eee000-42f0c000 rwxp 42eee000 00:00 0
42f0c000-42f12000 r-xs 000c8000 1f:00 446    /system/app/Music.apk
42f1d000-42f3e000 rwxp 42f1d000 00:00 0
42f3e000-42f3f000 ----p 42f3e000 00:00 0
42f3f000-4303e000 rwxp 42f3f000 00:00 0
4303e000-4303f000 ----p 4303e000 00:00 0
4303f000-4313e000 rwxp 4303f000 00:00 0
4313e000-4313f000 ----p 4313e000 00:00 0
4313f000-4323e000 rwxp 4313f000 00:00 0
4323e000-4323f000 ----p 4323e000 00:00 0
4323f000-4333e000 rwxp 4323f000 00:00 0
4333e000-4343c000 r-xp 00000000 00:0a 56     /dev/binder
4343c000-4343d000 ----p 4343c000 00:00 0
4343d000-4353c000 rwxp 4343d000 00:00 0
4353c000-4353d000 ----p 4353c000 00:00 0
4353d000-4363c000 rwxp 4353d000 00:00 0
4363c000-4368c000 r-xs 00079000 1f:00 446    /system/app/Music.apk
4368c000-4378c000 r-xp 00000000 00:07 1039   /dev/ashmem/dalvik-jit-code-cache (deleted)
437e7000-437ed000 r-xs 000c8000 1f:00 446    /system/app/Music.apk
437ed000-43827000 r-xp 00000000 1f:01 503    /data/dalvik-cache/system@app@Music.apk@classes.dex
80000000-800a2000 r-xp 00000000 1f:00 311    /system/lib/libdvm.so
```

Fig. 2

METHOD AND DEVICE FOR DETECTING SOFTWARE-TAMPERING

RELATED APPLICATIONS

This application is a continuation application of PCT Patent Application No. PCT/CN2013/090045, entitled "Method and Device for Detecting Software-Tampering" filed Dec. 20, 2013, which claims priority to Chinese Patent Application Serial No. CN201310247480.7, entitled "Verification Method and Device for Preventing Software-Tampering" filed Jun. 20, 2013, both of which are incorporated herein by reference in their entirety.

FIELD OF THE INVENTION

The present disclosure relates to the computer technical field, in particular, to a kind of verification method and device for preventing software-tampering.

BACKGROUND OF THE INVENTION

At present, the digital lifestyle has been widely promoted and popularized. People's daily work, study and recreation have become attached to various types of application software. As a result, the security issue of software has received a great deal of attention.

In an attempt to steal privacy information, bank account information, and so on, from users, some attackers embed malicious code into benign software applications that the users may desire, or modify or delete part of the software code, through the method of software tampering. The modified software is then used to obtain the key information of the users for the benefit of the attackers. Software tampering frequently appears in games, online payment software, or social networking software. In order to prevent the use of this kind of tampering, verification of the software installed at a terminal device becomes important.

Conventional software verification methods for preventing software tampering simply verify all or part of the data of software to determine whether the verification result is correct or not, and thereby determine whether the software have been tampered with. However, because the software data used for verification is fixed, its correct verification result can be easily obtained by attackers who will then counterfeit the desired verification result based on their knowledge in order to pass the software verification. This would cause inaccuracy of the software verification results, and bring data security risks.

SUMMARY

In some embodiments, a method of detecting software tampering includes: at a device having one or more processors and memory: receiving a software verification instruction from a server, the software verification instruction comprising a verification parameter dynamically selected by the server for verifying whether particular software stored at the device contains unauthorized modifications; executing a respective verification procedure corresponding to the verification parameter to obtain a first verification data value; and returning the first verification data value to the server, wherein the server compares the first verification data value to a second verification data value to determine whether the particular software stored at the device contains unauthorized modifications.

In another aspect, a device comprises one or more processors, memory, and one or more program modules stored in the memory and configured for execution by the one or more processors. The one or more program modules include instructions for performing the method described above. In another aspect, a non-transitory computer readable storage medium having stored thereon instructions, which, when executed by a device, cause the device to perform the method described above.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

FIG. 2 is a diagram of the data distribution within the memory mapping range of a client device in accordance with some embodiments;

Like reference numerals refer to corresponding parts throughout the several views of the drawings.

DESCRIPTION OF EMBODIMENTS

Figure 1:
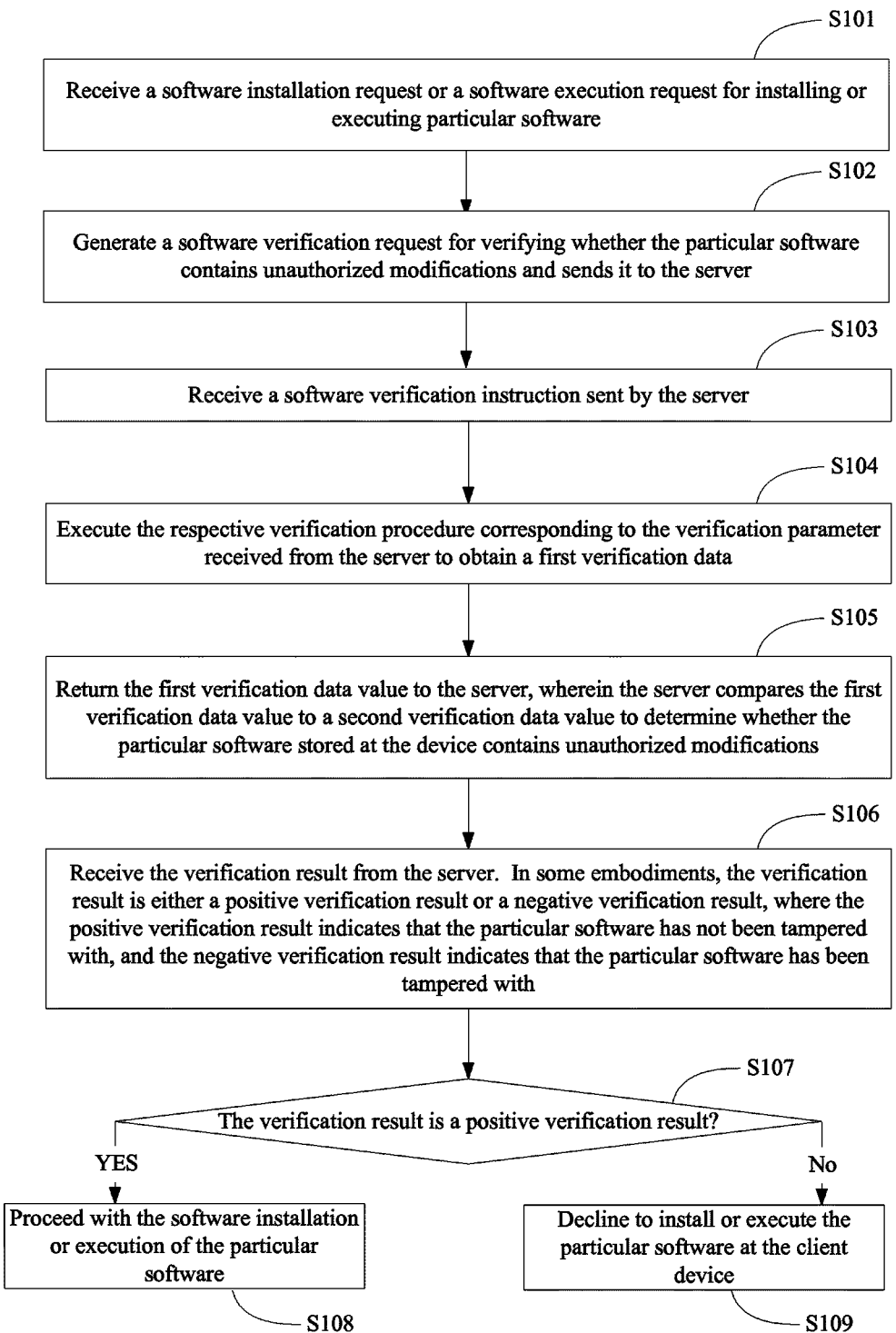
FIG. 1 is a flowchart for a client-side method of detecting software tampering in accordance with some embodiments.

In order to make a clearer understanding of the purpose, technical scheme and advantages of the present invention, the following will give further detailed description with reference to attached drawings and embodiments. It should be understood that the specific embodiment described herein is merely used to illustrate the present invention, rather than to limit the present invention.

In some embodiments, in the process of verifying whether tampering has occurred to software, a server dynamically determines a verification parameter, and a client device carries out the verification process according to the dynamically generated verification parameter to obtain a verification result. Since different verification parameters would produce different verification results, the problems due to the invariability of verification result in conventional tampering prevention techniques may be avoided. In contrast, as disclosed herein, once particular software under examination has been tampered, a dynamic verification result can be correctly obtained through the method disclosed herein using the dynamically generated verification parameter. Thus, the accuracy of the verification result regarding whether the particular software has been tampered with may be improved.

As described herein, the software conducting the tampering detection verification process has server-side software which corresponds with client-side software counterpart. In some embodiments, the client-side verification software can be embedded in a terminal device, such as a mobile phone, a personal computer, a tablet, a laptop, etc., that has network access functions, and can communicate with the server through a network (e.g., the Internet). In some embodiments, the functions which can be realized by the server-side verification software include but are not limit to: managing the user data of its client-side devices, forwarding data among different client-side devices, releasing new versions of the verification software to the client-side devices, and so on.

Although the description of the tampering detection verification method and processes refer to the interaction between a server device and a client device, in some embodiments, all steps of the processes may be performed by a single device (e.g., a client device). Specifically, in some embodiments, the steps that are performed by the server-side verification software in a client-server embodiment are optionally performed by a master verification module residing on a terminal device, and the steps that are performed by the client-side verification software in the client-server embodiment are optionally performed by a slave verification module also residing on the terminal device. In some embodiments, the master verification module and the slave verification module are installed on different parts of the terminal device (e.g., on different partitions of a disk, or memory partitions having different security levels), such that the master verification module is shielded from access by ordinary software applications installed on the terminal device. In a standalone embodiment, the communications between the master verification module and the slave verification module are optionally encrypted to avoid snooping by other software residing at the terminal device.

FIG. 1 is a flowchart of a verification method for detecting software tampering in accordance with some embodiments. In some embodiments, the process shown in FIG. 1 is performed by a client-side device. In some embodiments, the process shown in FIG. 1 is performed by a slave verification module of a terminal device, and the server referred to in the process is served by a master verification module of the terminal device.

In S101, a client device receives a software installation request or a software execution request for installing or executing particular software. For example, in some embodiments, the client-side verification software installed at the client device monitors all software installations and software execution at the client device. Each time a software installation or execution is to be started at the client device, the verification software intercepts the installation or execution request before the request is carried out, and performs the verification process first. In some embodiments, the client device obtains the software identification information (e.g., the software name, version, vendor, authorization code, etc.) from the software installation or execution request. In some embodiments, for software that has already gone through the verification process once before, the client device optionally allows the execution of the software without further verification. In some embodiments, the client device optionally performs the verification process periodically, even if the software has passed the verification process one or more times before. In some embodiments, the client device performs the verification process for only certain software identified in a high-risk software list. In some embodiments, the client device performs the verification process for only certain software that falling into particular high risk categories, e.g., social networking, gaming, shopping, etc.

In S102, once the client device determines that verification should proceed for particular software for which a installation or execution request has been received, the client device generates a software verification request for verifying whether the particular software contains unauthorized modifications (i.e., whether the particular software has been tampered with) and sends it to the server. In some embodiments, the software verification request identifies to the server the name, version, and other specific details (e.g., a download location, a download date, vendor name, etc.) regarding the particular software to be installed or executed. In some embodiments, the software verification request also identifies to the server whether the particular software is to be installed, or to be executed at the client device. In some embodiments, the software verification request also identifies to the server the previous verification history (e.g., the times or request ID for previous positive verifications made for the particular software) for the particular software. In some embodiments, the verification server generates the verification parameter based on some or all of the above information that is contained in the software verification request. More details on how the verification server generates the verification parameter are disclosed in FIG. 3 and accompanying descriptions.

In S103, the client device receives a software verification instruction sent by the server. In some embodiments, the software verification instruction includes the above-mentioned software verification parameter that is dynamically selected by the server for verifying whether the particular software stored at the client device contains unauthorized modifications.

In some embodiments, the server sends the software verification instruction to the client-side in response to the software triggering request initiated by the client-side verification software residing at the client device. In some embodiments, the server may also optionally initiates the software verification process sua sponte, without receiving the verification request from the client device first. In some embodiments, the client-side device sends the verification request to the server periodically (e.g., at every preset time intervals). In some embodiments, the client-side device sends the verification request to the server at prescheduled times. In some embodiments, the client-side device optionally sends the verification request to the server at the prompt of the user.

In some embodiments, the server will send the software verification instruction to the client device, where the verification instruction carries a verification parameter that contains instruction regarding how the client device is to conduct the detection of software tampering for the particular software in question. In some embodiments, the server may choose to send one of many possible verification parameters, where each verification parameter corresponds to a respective verification procedure or logic. For example, each verification procedure or logic will address the tampering of a particular kind that may be present in the particular software, such has modifying the registry, modifying a memory block redirection, etc. within the software development process. In some embodiments, particular verification procedures or logics are optionally reserved for each particular type of software. For example, for social networking software, a set of verification procedures are selected by the server, while for online payment software, a different set of verification procedures are selected by the server. In some embodiments, the server uses the information contained in the verification request as the basis for selecting the particular verification parameter for the verification instruction. In some embodiments, the server uses some information (e.g., software type, software name, etc.) contained in the verification request as the basis for selecting the particular verification procedure, and uses other information (e.g., version number, current date, download time, download location, etc.) contained in the verification request for selecting the sampling locations for obtaining data to be applied to the selected verification procedure. In some embodiments, the information contained in the verification request is used as seed(s) for dynamically generating a random number for selecting the verification procedure and/or the sampling locations for the verification instruction.

In some embodiments, after the server generates the verification parameter in accordance with the rules for linking between each kind of verification parameter and its corresponding verification logic and/or sampling locations on the client-side, and sends the verification parameter to the client device, the client de can proceed with the verification processes. In some embodiments, the server optionally sends multiple verification parameters to the client device, and the client device performs the respective verification procedure in accordance with each of the received verification parameters.

In S104, the client device executes the respective verification procedure corresponding to the verification parameter received from the server to obtain a first verification data.

In some embodiments, the verification parameter specifies a respective verification function, and wherein the respective verification function is dynamically selected at random by the server from a plurality of available verification procedures. In some embodiments, the verification procedure executed by the client device includes applying the verification function to one or more sample data values available at the client device to obtain the first verification data. In some embodiments, the sample data values optionally include some or all of the information that has been set to the server through the verification request. In some embodiments, the verification parameter specifies one or more data sampling locations, and the verification procedure includes applying the verification function to sample data values obtained at the one or more data sampling locations. In some embodiments, the verification function is a hash function. In some embodiments, the verification function is another function that always produces a predicable fixed result for the same input sample values. In some embodiments, the one or more data sampling locations are dynamically selected at random by the server from a plurality of known sampling locations.

In some embodiments, the verification parameter includes the sampling locations, and at least one of the sampling locations includes a file path under the installation index of the particular software at the client device. In some embodiments, when this file path points to a document under the installation directory of the particular software, it indicates that the sample data value that is to be obtained at this sampling location is the data contained in this file. In some embodiments, when this file path points to a file folder under the installation directory of the particular software, it indicates that the sample data value that is to be obtained at this sampling location is all the data contained in this file folder. In some embodiments, the sample data value is binary data contained in the identified document or folder. In some embodiments, the sample data value is plain text contained in the identified document or folder. In some embodiments, the sample data value is encrypted data contained in the identified document or folder. In some embodiments, the installation directory file structure and file content can be obtained by the server from the legitimate software developer of the particular software, and the server thus has knowledge of what correct sample data values should be obtained from any sampling locations if the software has not been tampered with. If the sample data values obtained at the sampling locations differ from what are expected by the server, the server can determine that the particular software has been tampered with. Since the server can pre-store all file structure and the corresponding file contents under the installation directory of its client in the server, and the server can randomly and/or dynamically appoint one or many file paths under the installation directory of its client-side as the sampling locations, the likelihood of circumventing the verification or counterfeiting the verification result using static information embedded tampered software is reduced.

In some embodiments, when a respective data sampling location specified by the verification parameter includes a file path under an installation index of the particular software, obtaining the respective data values present at the one or more data sampling locations in the particular software residing at the device further includes selecting a document in the particular software according the file path; and taking data contained in the document as the respective sample data value for the respective data sampling location.

In general, as appear to a software developer, when a piece of software is running on the client device, the memory space occupied by the software on this device is known. FIG. 2 illustrates the memory mapping range of an exemplary Android device when particular software installed on the Android device is executing. The first column of data shown in FIG. 2 include the addresses within each memory mapping range, and the last column of the data shown in FIG. 2 include the data content loaded within the corresponding memory mapping range. Therefore, in the server, the same data allocation map containing the data content for each memory mapping range for each software that are likely to be verified can be pre-stored. The server can then randomly designate one or more memory mapping ranges as the data sampling locations for a particular verification process, and thus dynamically determine the correct sample data for the selected data sampling locations.

It should be noted that, for the terminal devices of different operating systems, e.g., the terminal devices running Android, iOS or WP8 (Windows Phone 8) and other operating systems, when the same software is running on the terminal device, the data content in a respective memory mapping range remains the same given the memory offset location for the respective memory mapping range, and only the absolute positions of the memory ranges are different. Therefore, in some embodiments, the server is configured to sample different memory mapping ranges depending on the particular kind of operating system that is used by the client device.

In some embodiments, the data sampling locations dynamically determined by the server include both the memory mapping range(s) and the file path(s) under the installation directory of the particular software, and thus further ensure the unpredictability of sample data values.

In some embodiments, the verification parameter can also include executable code, and the verification procedure corresponding to this verification parameter is that the client-side executes the executable code, and uses the output value obtained through executing the executable code as the first verification data value. In some embodiments, when the verification parameter includes executable code, executing the respective verification procedure corresponding to the verification parameter to obtain the first verification data value further includes executing the executable code at the device, where the executable code generates the first verification data value based on data currently present at the device.

In some embodiments, during execution of the executable code included in the verification parameter, the executable code is used to call one of the functions of the particular software, and output the data result generated by the particular software when this function is called. If the particular software has not been tampered with, the data result obtained by calling this function would always be the same. Therefore, this data result can be used as the first verification data value to determine whether the software has been tampered with. In some embodiments, when the software is game software or trial version software, during execution of the executable code included in the verification parameter, the executable code is used to output the current system time of the client device. Since the game software or the trial version software frequently use the current system time as the means to determine whether continued use of the software will be allowed, the current system time can be used as the first verification data value. If the software continues to be used under illegal or unauthorized situations through tampering, this can be determined through the first verification data value based on current system time.

In some embodiments, the verification data values obtained at the different sampling locations can be pictures, character strings, binary code, and other data with random data types. In some embodiments, the verification procedures or verification functions adopted for the software verification process can be preset in the server and the client device. In some embodiments, the verification process and verification functions as well as the verification data values can be provided by the legitimate vendors of the particular software to the server and the client device. In some embodiments, the client device and the server can download this information from a web server of the legitimate vendor of the particular software, and thus ensuring that the server and the client device gets the same verification logic.

In some embodiments, the particular verification procedure to be used for a present verification process can determined dynamically by the server before each verification process and informed to the client-side. Specifically, the server can randomly select a particular verification procedure from a plurality of preset verification procedures and algorithms, embed the selected verification procedure in the verification instruction as one of verification parameters, and send the verification procedure to the client-side together with sampling locations.

In an example embodiment, the verification function can be a Hash function. If the verification function is expressed by f( ), and the sample data values are expressed by S, when the server dynamically indicates multiple sampling locations, the client-side device respectively obtains sample data values S1, S2, S3, . . . from these sampling locations, and accordingly, the obtained first verification value is f(S1, S2, S3, . . . ).

In various embodiments, the verification parameter dynamically determined by the server and the corresponding verification logic need not be limited to those described above for illustrative purposes. As long as correct verification data value obtained through client-side performing the verification logic corresponding to the verification parameter can be uniquely reproduced on the server and used for verification purposes, the verification parameter may be employed for the software verification purposes.

In S105, the client device returns the first verification data value to the server, wherein the server compares the first verification data value to a second verification data value to determine whether the particular software stored at the device contains unauthorized modifications. If the comparison indicates that the first verification value is the same as the second verification value that is the correct verification value corresponding to the above-mentioned verification parameter pre-stored at the mentioned server, then it is determined that the particular software has not been tampered with. Otherwise, it is determined that the particular software has been tampered with.

In S106, the client device receives the verification result from the server. In some embodiments, the verification result is either a positive verification result or a negative verification result, where the positive verification result indicates that the particular software has not been tampered with, and the negative verification result indicates that the particular software has been tampered with. In some embodiments, the verification result is encrypted such that it cannot be altered during transmission or after arrival at the client device. In some embodiments, after the server receives the first verification value from the client device, the server retrieves the pre-stored or dynamically calculated correct verification value corresponding to the dynamically selected verification parameter, namely, the second verification value. Therefore, through determining whether the first verification value returned by the client device is consistent with the second verification value pre-stored or dynamically calculated by the server, the server can determine whether the particular software stored at the client device has been tampered with. The server then formulates a verification result according to the determination and sends it back to the client device.

In S107, the client device determines whether the verification result received from the server is a positive verification result or a negative verification result. If the result is a positive verification result, in S108, the client device proceeds with the software installation or execution of the particular software. If the result is a negative verification result, in S109, the client device declines to install or execute the particular software at the client device.

Figure 3:
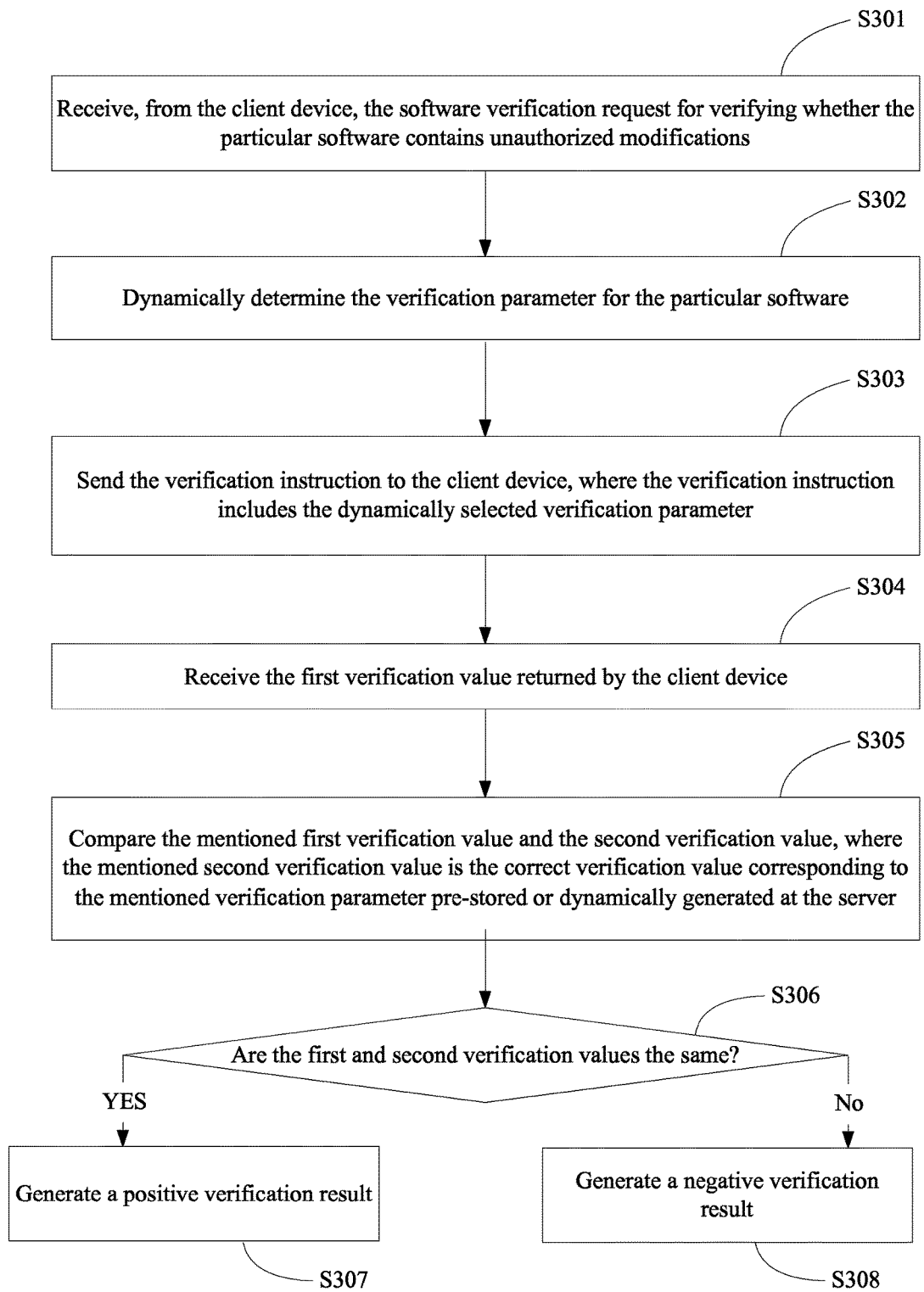
FIG. 3 is a flowchart for a server-side method of detecting software tampering in accordance with some embodiments.

FIG. 3 is a flowchart of a server-side method for detecting software tamper in accordance with some embodiments. In some embodiments, the executive agent of flow is the server-side verification software conducting the software verification. In some embodiments, the master verification module located at the client device performs the flow, even though the flow refers to a server.

In S301, the server optionally receives, from the client device, the software verification request for verifying whether the particular software contains unauthorized modifications.

In S302, the server dynamically determines the verification parameter for the particular software. In some embodiments, the server determines the verification parameter at least in part in accordance with information stored in the software verification request.

In some embodiments, the server can initiate the software verification process without first receiving the verification request from the client. Instead, the server optionally initiates the verification process at every preset time interval. In some embodiments, the server optionally initiates the verification process at scheduled times. In some embodiments, the server determines the verification parameter in response to receiving the verification request from the client device.

In some embodiments, each verification parameter corresponds to a respective verification procedure or logic. After the server has pre-established the association between each verification parameter and its corresponding verification procedure with the client-side, the client-side can perform the corresponding verification procedure according to the verification parameter in the verification instruction received from the server.

In some embodiments, the server randomly determines which verification parameter to use and what value(s) to give to verification parameter according to a pseudo-random algorithm that utilizes information included in the verification request as seed.

In some embodiments, the verification parameter includes the sampling locations, and at least one of the sampling locations includes a file path under the installation index of the particular software at the client device. In some embodiments, when this file path points to a document under the installation directory of the particular software, it indicates that the sample data value that is to be obtained at this sampling location is the data contained in this file. In some embodiments, when this file path points to a file folder under the installation directory of the particular software, it indicates that the sample data value that is to be obtained at this sampling location is all the data contained in this file folder.

In some embodiments, when a respective data sampling location specified by the verification parameter includes a file path under an installation index of the particular software, obtaining the respective data values present at the one or more data sampling locations in the particular software residing at the device further includes selecting a document in the particular software according the file path; and taking data contained in the document as the respective sample data value for the respective data sampling location.

In some embodiments, the data sampling locations dynamically determined by the server include both the memory mapping range(s) and the file path(s) under the installation directory of the particular software, and thus further ensure the unpredictability of sample data values.

In some embodiments, the verification parameter can also include executable code, and the verification procedure corresponding to this verification parameter is that the client-side executes the executable code, and uses the output value obtained through executing the executable code as the first verification data value.

In some embodiments, during execution of the executable code included in the verification parameter, the executable code is used to call one of the functions of the particular software, and output the data result generated by the particular software when this function is called.

In some embodiments, the particular verification procedure to be used for a present verification process can determined dynamically by the server before each verification process and informed to the client-side. Specifically, the server can randomly select a particular verification procedure from a plurality of preset verification procedures and algorithms, embed the selected verification procedure in the verification instruction as one of verification parameters, and send the verification procedure to the client-side together with sampling locations.

In various embodiments, the verification parameter dynamically determined by the server and the corresponding verification logic need not be limited to those described above for illustrative purposes. As long as correct verification data value obtained through client-side performing the verification logic corresponding to the verification parameter can be uniquely reproduced on the server and used for verification purposes, the verification parameter may be employed for the software verification purposes.

Other details regarding how the server determines the verification parameter are provided in FIGS. 1 and 2 and accompanying descriptions, and are not repeated herein.

In S303, the server sends the verification instruction to the client device, where the verification instruction includes the dynamically selected verification parameter, so as to allow the client device to obtain the first verification value through performing the verification procedure or logic corresponding to the mentioned verification parameter.

In some embodiments, after the server dynamically determines the verification parameter, it will send the verification instruction carrying the verification parameter to the client device, so as to make the client device perform the verification logic corresponding to this verification parameter to obtain the first verification value according to the process described in FIG. 1 and accompanying descriptions.

In S304, the server receives the first verification value returned by the client device.

In S305, the server compares the mentioned first verification value and the second verification value, where the mentioned second verification value is the correct verification value corresponding to the mentioned verification parameter pre-stored or dynamically generated at the server.

In some embodiments, after the client-side calculates out the first verification value, returns this first verification value to the server, the server compares the first verification data value to the second verification data value to determine whether the particular software stored at the device contains unauthorized modifications. In S306, the server determines whether the first verification value is the same as the second verification value. In S307, if the comparison indicates that the first verification value is the same as the second verification value that is the correct verification value corresponding to the above-mentioned verification parameter pre-stored at the mentioned server, then the server determines that the particular software has not been tampered with, and generates a positive verification result is obtained. Otherwise, in S308, the server determines that the particular software has been tampered with, and generates a negative verification result.

In S309, the server sends the verification result back to the client.

In some embodiments, in the process of verifying whether tampering has occurred to software, a server dynamically determines a verification parameter, and a client device carries out the verification process according to the dynamically generated verification parameter to obtain a verification result. Since different verification parameters would produce different verification results, the problems due to the invariability of verification result in conventional tampering prevention techniques may be avoided.

Figure 4:
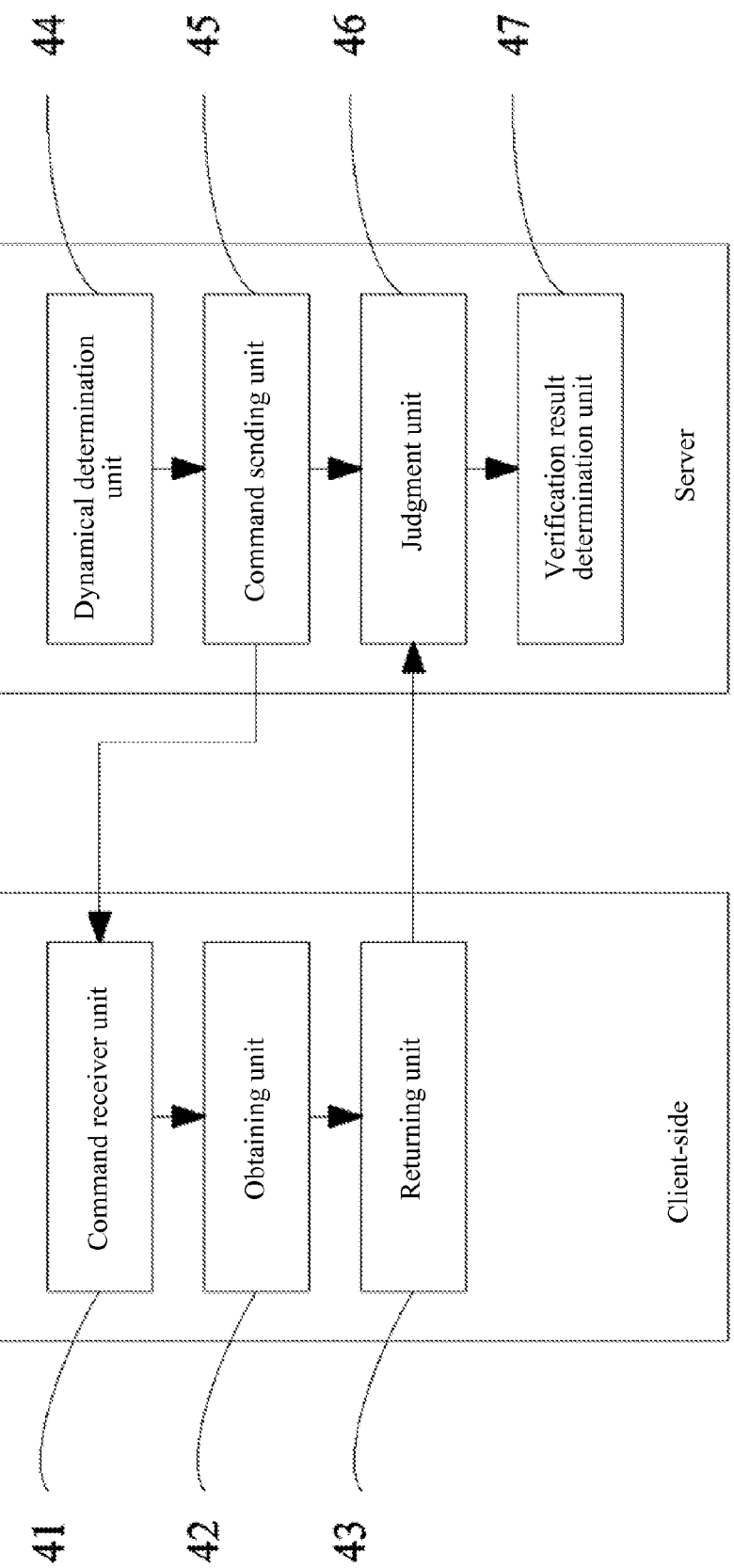
FIG. 4 is the structural diagram of verification devices for detecting software tampering in accordance with some embodiments.

FIG. 4 shows the structural diagram of an exemplary verification system for detecting software tampering in accordance with some embodiments. In some embodiments, this system can respectively include a client-side portion located at a client device, and a server portion located at a server device. In some embodiments, the client portion can be located at a first portion (e.g., regular memory) of a standalone device and the server portion can be located at a second portion (e.g., kernel) of the standalone device. The client-side portion performs some or all functions described with respect to the client device in the description of FIG. 1. The server-side portion performs some or all functions described with respect to the server in the description of FIG. 3.

Refer to FIG. 4, the client-side of the verification system includes:

Command receiver unit 41, configured to receive the verification instruction sent by the server, the mentioned verification instruction carries the mentioned verification parameter of the particular software, where the mentioned verification parameter is dynamically determined by the mentioned server.

Obtaining unit 42, configured to perform the verification procedure corresponding to the mentioned verification parameter to obtain the first verification value.

Returning unit 43, configured to return the mentioned first verification value to the mentioned server, so as to make the mentioned server determine whether the mentioned software has been tampered with through comparing the mentioned first verification value and the second verification value, where the mentioned second verification value is the correct verification value corresponding to the mentioned verification parameter pre-stored or dynamically generated at the mentioned server.

Optionally, the mentioned verification parameter includes the sampling locations.

The mentioned obtaining unit 42 includes:

Sample sub-unit, configured to obtain sample data values from the mentioned sampling locations.

Calculation sub-unit, configured to, according to the designated verification procedure, calculate the mentioned first verification value for the obtained sample data values.

Optionally, the mentioned sampling locations include a file path under the installation directory of software. The mentioned sample sub-unit is used to extract the file pointed by the mentioned file path, determine the data contained in the mentioned file as the mentioned sample data values.

Optionally, the mentioned sampling locations include a memory mapping range. The mentioned sample sub-unit is used to fetch the data in the mentioned memory mapping range when the mentioned software is running, and determine the fetched data as the mentioned sample data value.

Optionally, the mentioned verification parameter includes the executable code, and the mentioned obtaining unit 42 is used to execute the mentioned executable code and output the mentioned first verification value.

Optionally, the mentioned client-side device also includes:

Request sending unit, configured to send a verification request to the mentioned server, so as to make the mentioned server send the mentioned verification instruction.

The server-side of the verification system includes:

Dynamic determination unit 44, configured to dynamically determine the verification parameter of the mentioned software.

Command sending unit 45, configured to send the verification instruction to the client-side device, where the mentioned verification instruction carries the mentioned verification parameter, so as to make the mentioned client-side device obtain the first verification value through performing the verification logic corresponding to the mentioned verification parameter.

Judgment unit 46, configured to receive the mentioned first verification value returned by the client-side device, compare the mentioned first verification value and the second verification value, where the mentioned second verification value is the correct verification value corresponding to the mentioned verification parameter pre-stored or dynamically generated in the mentioned server.

Verification result determination unit 47, configured to, when the mentioned first verification value is same with the mentioned second verification value, determine that the mentioned software has not been tampered with; and when the mentioned first verification value is different from the mentioned second verification value, determine that the mentioned software has been tampered with.

The mentioned server-side device also includes:

Algorithm determination unit, configured to randomly determine a respective verification function from a plurality of preset verification functions for use in the verification procedure.

Optionally, the mentioned server-side device also includes:

Request receiver unit, configured to receive the verification request sent by the mentioned client-side device.

In some embodiments, in the process of verifying whether tampering has occurred to software, a server dynamically determines a verification parameter, and a client device carries out the verification process according to the dynamically generated verification parameter to obtain a verification result. Since different verification parameters would produce different verification results, the problems due to the invariability of verification result in conventional tampering prevention techniques may be avoided.

Meanwhile, adopting the method and device provided herein can effectively conduct the security detection for the self security of software and the installation environment of software, especially for the software of foreground-background interaction types, like online trading software, communication software, in which effective detection of software tamper can improve data protection and privacy.

Figure 5:
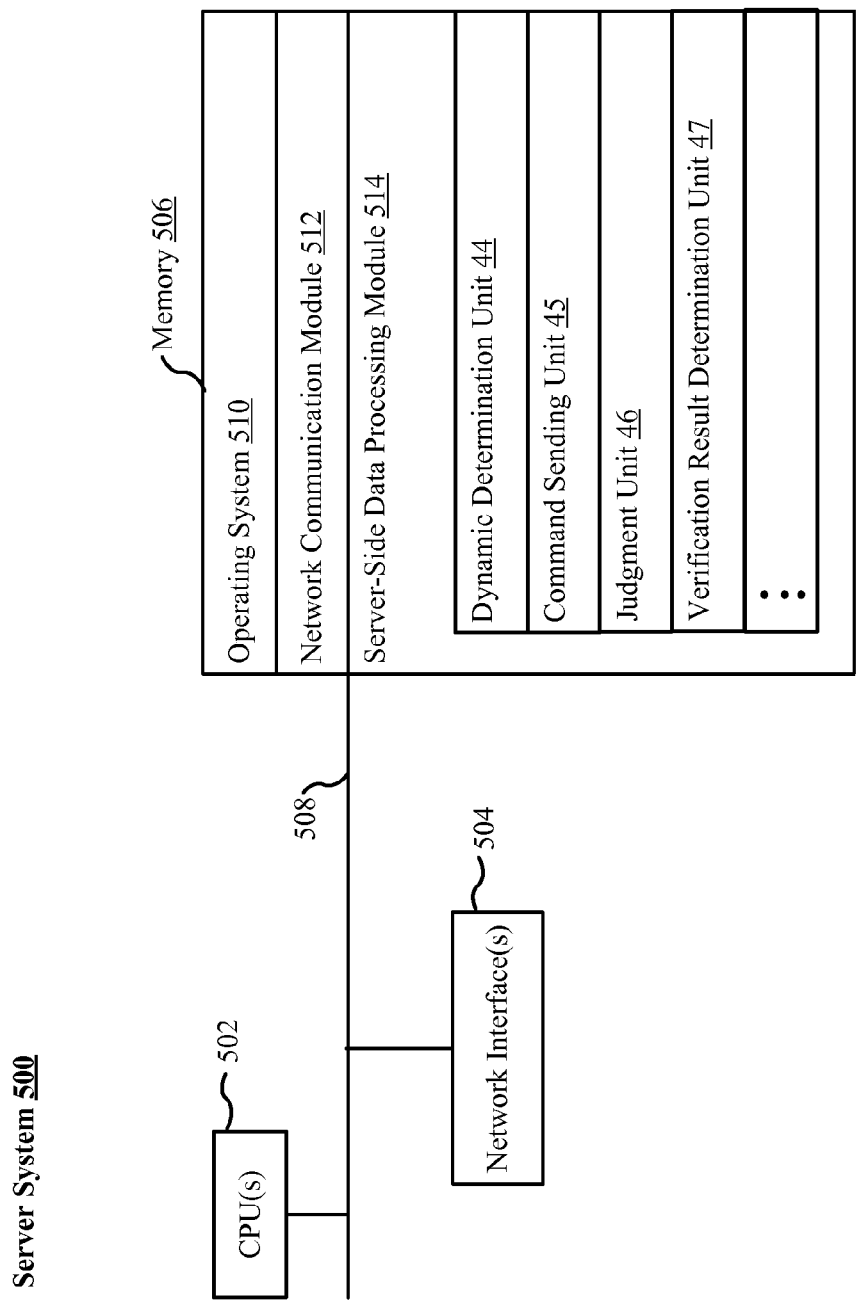
FIG. 5 is a block diagram of an exemplary server device in accordance with some embodiments.

FIG. 5 is a block diagram illustrating a server system 500 in accordance with some embodiments. The server system 500 can be used to serve as the server described above with respect to FIGS. 1-4. Server system 500, typically, includes one or more processing units (CPUs) 502, one or more network interfaces 504, memory 506, and one or more communication buses 508 for interconnecting these components (sometimes called a chipset). Memory 506 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 506, optionally, includes one or more storage devices remotely located from the CPU(s) 502. Memory 506, or alternately the non-volatile memory device(s) within memory 506, includes a non-transitory computer readable storage medium. In some implementations, memory 506, or the non-transitory computer readable storage medium of memory 506, stores the following programs, modules, and data structures, or a subset or superset hereof: an operating system 510 including procedures for handling various basic system services and for performing hardware dependent tasks; a network communication module 512 that is used for connecting server system 500 to other computing devices (e.g., client device 600 in FIG. 6) connected to one or more networks via one or more network interfaces 504 (wired or wireless); a server-side data processing module 514 for enabling server system 500 to perform client environment data processing, including but not limited to: dynamic determination unit 44, command sending unit 45, judgment unit 46, and verification result determination unit 47.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 506, optionally, stores a subset of the modules and data structures identified above. Furthermore, memory 506, optionally, stores additional modules and data structures not described above.

Figure 6:
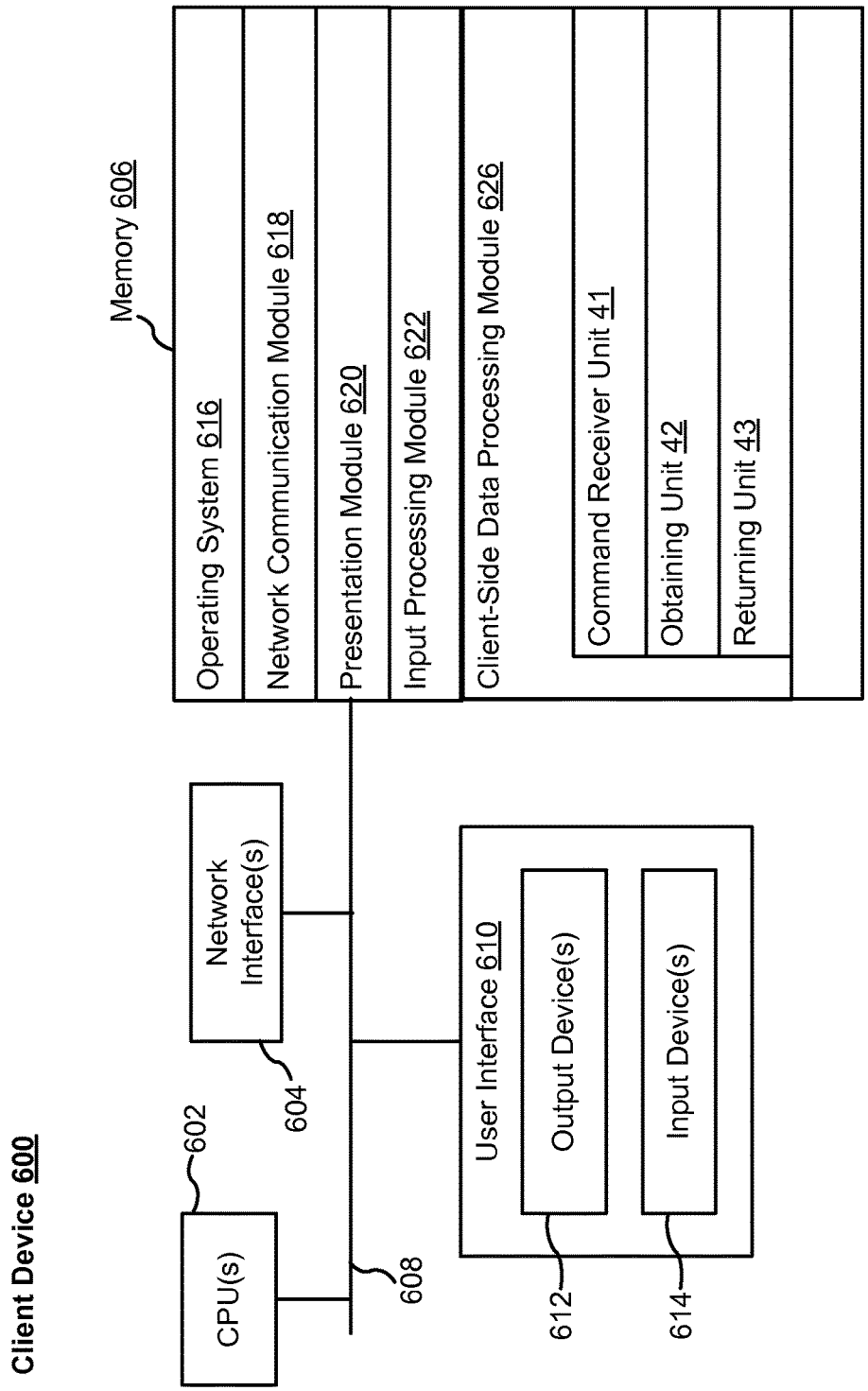
FIG. 6 is a block diagram of an exemplary client device in accordance with some embodiments.

FIG. 6 is a block diagram illustrating a representative client device 600 in accordance with some embodiments. Client device 600, typically, includes one or more processing units (CPUs) 602, one or more network interfaces 604, memory 606, and one or more communication buses 608 for interconnecting these components (sometimes called a chipset). Client device 600 also includes a user interface 610. User interface 610 includes one or more output devices 612 that enable presentation of media content. User interface 610 also includes one or more input devices 614, including user interface components that facilitate user input such as a keyboard, a mouse, a voice-command input unit or microphone, a touch screen display, a touch-sensitive input pad, a gesture capturing camera, or other input buttons or controls. Furthermore, some client devices 600 use a microphone and voice recognition or a camera and gesture recognition to supplement or replace the keyboard. Memory 606 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 606, optionally, includes one or more storage devices remotely located from CPU(s) 602. Memory 606, or alternately the non-volatile memory device(s) within memory 606, includes a non-transitory computer readable storage medium. In some implementations, memory 606, or the non-transitory computer readable storage medium of memory 606, stores the following programs, modules, and data structures, or a subset or superset thereof: an operating system 616 including procedures for handling various basic system services and for performing hardware dependent tasks; a network communication module 618 for connecting user device 600 to other computers (e.g., server system 500) connected to one or more networks via one or more communication network interfaces 604 (wired or wireless); a presentation module 620 for enabling presentation of information (e.g., a user interface for a web page or an application program, audio and/or video content, text, etc.) at client device 600 via one or more output devices 612 (e.g., displays, speakers, etc.) associated with user interface 610; an input processing module 622 for detecting one or more user inputs or interactions from one of the one or more input devices 614 and interpreting the detected input or interaction; and a client-side data processing module 626 for processing client environment data, including but not limited to: a command receiver unit 41, an obtaining unit 42, and a returning unit 43.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

Although FIGS. 5-6 shows server system 500 and client device 600, respectively, FIGS. 5-6 are intended more as functional description of the various features which may be present in a set of servers than as a structural schematic of the implementations described herein. In practice, and as recognized by those of ordinary skill in the art, items shown separately could be combined and some items could be separated. For example, some items shown separately in FIGS. 5-6 could be implemented on a single device and single items could be implemented by one or more devices.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of detecting software tampering, comprising: at a device having one or more processors and memory:
sending a software verification request of a first software to a server in connection with executing the first software at the device, wherein the software verification request identifies at least one information item selected from (1) identification information of the first software, (2) an operation to be performed to the first software, and (3) a verification history associated with the first software;
receiving a software verification instruction from the server, the software verification instruction comprising a verification parameter generated by the server based on the at least one information item identified in the software verification request for verifying whether the first software stored at the device contains unauthorized modifications, wherein the verification parameter includes executable code for invoking a function of the first software;
executing a respective verification procedure corresponding to the verification parameter to obtain a first verification data value, further comprising executing the executable code to invoke the function of the first software at the device to generate an output as the first verification data value based on data currently present at the device; and returning the first verification data value to the server, wherein the server compares the first verification data value to a second verification data value to determine whether the first software stored at the device contains unauthorized modifications.

2. The method of claim 1, wherein the verification parameter further specifies a respective verification function, and wherein the respective verification function is randomly selected by the server from a plurality of available verification procedures.

3. The method of claim 1, wherein the verification parameter further specifies one or more data sampling locations.

4. The method of claim 3, wherein the one or more data sampling locations are randomly selected by the server from a plurality of known sampling locations.

5. The method of claim 3, wherein executing the respective verification procedure corresponding to the verification parameter to obtain the first verification data value further comprises:
  obtaining respective data values present at the one or more data sampling locations in the first software residing at the device; and
  applying a verification function on the respective data values obtained at the one or more data sampling locations to calculate the first verification data value.

6. The method of claim 5, wherein a respective data sampling location specified by the verification parameter includes a file path under an installation index of the first software, and wherein obtaining the respective data values present at the one or more data sampling locations in the first software residing at the device further comprises:
  selecting a document in the first software according the file path; and
  taking data contained in the document as the respective data value for the respective data sampling location.

7. The method of claim 5, wherein a respective data sampling location specified by the verification parameter includes a memory mapping range of the first software during execution, and wherein obtaining the respective data values present at the one or more data sampling locations in the first software residing at the device further comprises:
  during execution of the first software at the device, reading data present within the memory mapping range of the first software; and
  taking the data present within the memory mapping range as the respective data value for the respective data sampling location.

8. The method of claim 1, further comprising:
  before sending the software verification request of the first software to the server:
    receiving a software execution request for executing the first software at the device; and
    in response to the software execution request, sending the software verification request for verifying the first software to the server.

9. The method of claim 8, further comprising:
  after returning the first verification data value to the server:
    receiving a negative verification result from the server indicating that the first software contains unauthorized modifications; and
    upon receiving the negative verification result, declining to execute the first software at the device.

10. A system for detecting software tampering, comprising:
  one or more processors; and
  memory having instructions stored thereon, the instructions, when executed by the one or more processors, cause the processors to perform operations comprising:
    sending a software verification request of a first software to a server in connection with executing the first software at a device, wherein the software verification request identifies at least one information item selected from (1) identification information of the first software, (2) an operation to be performed to the first software, and (3) a verification history associated with the first software;
    receiving a software verification instruction from the server, the software verification instruction comprising a verification parameter generated by the server based on the at least one information item identified in the software verification request for verifying whether the first software stored at the device contains unauthorized modifications, wherein the verification parameter includes executable code for invoking a function of the first software;
    executing a respective verification procedure corresponding to the verification parameter to obtain a first verification data value, further comprising executing the executable code to invoke the function of the first software at the device to generate an output as the first verification data value based on data currently present at the device; and
    returning the first verification data value to the server, wherein the server compares the first verification data value to a second verification data value to determine whether the first software stored at the device contains unauthorized modifications.

11. The system of claim 10, wherein the verification parameter further specifies one or more data sampling locations, and wherein executing the respective verification procedure corresponding to the verification parameter to obtain the first verification data value further comprises:
  obtaining respective data values present at the one or more data sampling locations in the first software residing at the device; and
  applying a verification function on the respective data values obtained at the one or more data sampling locations to calculate the first verification data value.

12. The system of claim 11, wherein a respective data sampling location specified by the verification parameter includes a file path under an installation index of the first software, and wherein obtaining the respective data values present at the one or more data sampling locations in the first software residing at the device further comprises:
  selecting a document in the first software according the file path; and
  taking data contained in the document as the respective data value for the respective data sampling location.

13. The system of claim 11, wherein a respective data sampling location specified by the verification parameter includes a memory mapping range of the first software during execution, and wherein obtaining the respective data values present at the one or more data sampling locations in the first software residing at the device further comprises:
  during execution of the first software at the device, reading data present within the memory mapping range of the first software; and taking the data present within the memory mapping range as the respective data value for the respective data sampling location.

14. The system of claim 10, wherein the operations further comprise:
before sending the software verification request of the first software to the server:
receiving a software execution request for executing the first software at the device; and
in response to the software execution request, sending the software verification request for verifying the first software to the server; and
after returning the first verification data value to the server:
receiving a negative verification result from the server indicating that the first software contains unauthorized modifications; and
upon receiving the negative verification result, declining to execute the first software at the device.

15. A non-transitory computer-readable medium having instructions stored thereon, the instructions, when executed by one or more processors, cause the processors to perform operations comprising:
sending a software verification request of a first software to a server in connection with executing the first software at the device, wherein the software verification request identifies at least one information item selected from (1) identification information of the first software, (2) an operation to be performed to the first software, and (3) a verification history associated with the first software;
receiving a software verification instruction from the server, the software verification instruction comprising a verification parameter generated by the server based on the at least one information item identified in the software verification request for verifying whether the first software stored at the device contains unauthorized modifications, wherein the verification parameter includes executable code for invoking a function of the first software;
executing a respective verification procedure corresponding to the verification parameter to obtain a first verification data value, executing further comprising executing the executable code to invoke the function of the first software at the device to generate an output as the first verification data value based on data currently present at the device; and
returning the first verification data value to the server, wherein the server compares the first verification data value to a second verification data value to determine whether the first software stored at the device contains unauthorized modifications.

16. The computer-readable medium of claim 15, wherein the verification parameter further specifies one or more data sampling locations, and wherein executing the respective verification procedure corresponding to the verification parameter to obtain the first verification data value further comprises:
obtaining respective data values present at the one or more data sampling locations in the first software residing at the device; and
applying a verification function on the respective data values obtained at the one or more data sampling locations to calculate the first verification data value.

17. The computer-readable medium of claim 16, wherein a respective data sampling location specified by the verification parameter includes a file path under an installation index of the first software, and wherein obtaining the respective data values present at the one or more data sampling locations in the first software residing at the device further comprises:
selecting a document in the first software according the file path; and
taking data contained in the document as the respective data value for the respective data sampling location.

18. The computer-readable medium of claim 16, wherein a respective data sampling location specified by the verification parameter includes a memory mapping range of the first software during execution, and wherein obtaining the respective data values present at the one or more data sampling locations in the first software residing at the device further comprises:
during execution of the first software at the device, reading data present within the memory mapping range of the first software; and
taking the data present within the memory mapping range as the respective data value for the respective data sampling location.

* * * * *